March 20, 1945.   J. D. LANGDON   2,371,830
COMBINED STOP AND FLOAT VALVE
Filed Oct. 1, 1941
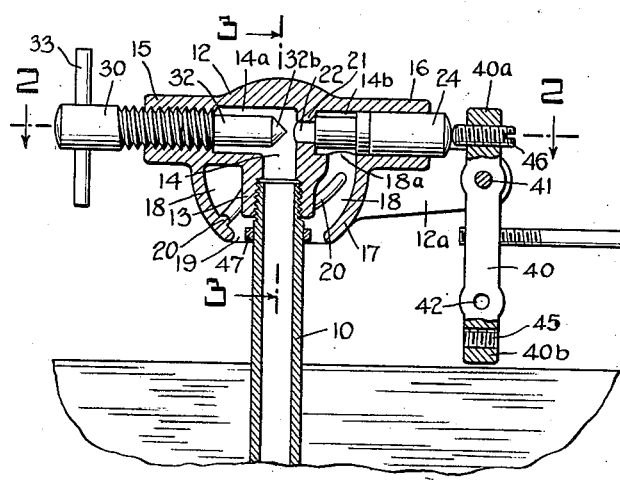
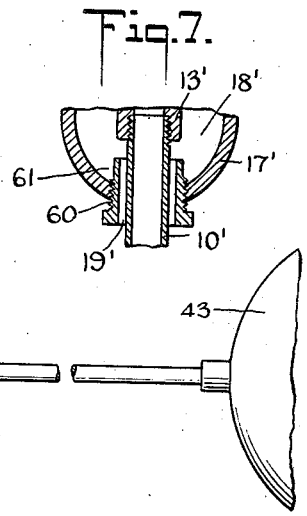
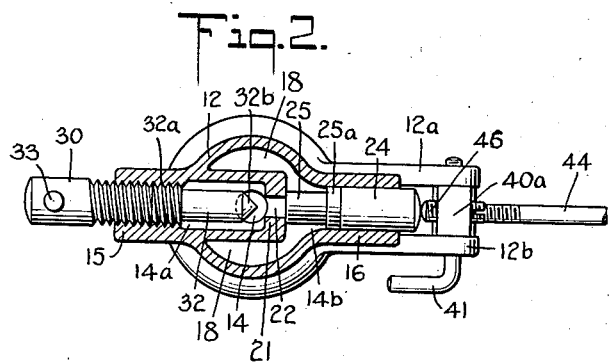
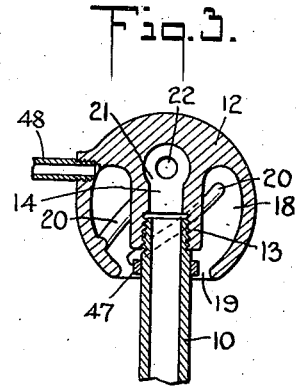
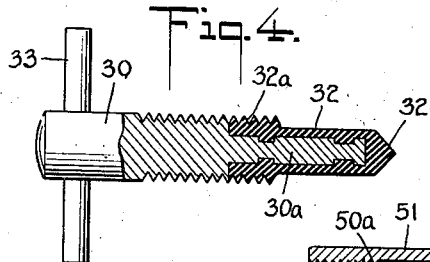
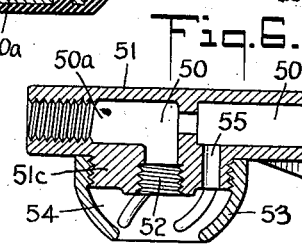
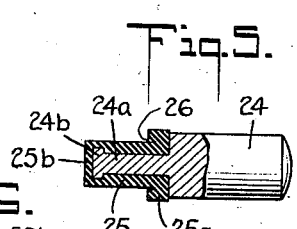
INVENTOR
Jesse D. Langdon
BY
Henry J. Luere
ATTORNEY Patented Mar. 20, 1945

2,371,830

UNITED STATES PATENT OFFICE 2,371,830

COMBINED STOP AND FLOAT VALVE

Jesse D. Langdon, Los Angeles, Calif.

Application October 1, 1941, Serial No. 413,089

10 Claims. (Cl. 137—104)

This invention relates to valves, preferably float-operated, and is especially useful as applied to ball and cock tank flush valves employed in connection with water closets or other waste disposal plumbing systems.

A primary object of the invention is to provide a very simple mechanism whose parts are so positioned as to be quickly and easily accessible for repair without, ordinarily, necessitating the shutting off of flow of liquid at the source.

Another object is to simplify the manufacture of valves of the type specified.

Another object is to provide a valve of the type specified which will be free from any danger of back siphonage.

A further object is to provide a valve of the type specified which includes a metering shut-off valve as a part thereof.

A still further object is to provide a valve of the type specified which will guide the outflow therefrom relatively closely about the outer walls of the supply pipe.

A feature of the invention in the attainment of the above objects resides in the construction of the valve body, whereby the passage leading from connection with the supply piping turns back upon itself and terminates in an annular discharge orifice which substantially surrounds the supply piping.

Another feature resides in the provision of an adjustable stop valve element, and of a movable cock valve element, both serving to control the flow of liquid through the stated passage, the latter preferably in accordance with the operation of float actuated means.

A further feature resides in the peculiar construction of the respective valve elements.

Further objects and features of the invention will be apparent from the following detailed description of the specific embodiments illustrated in the drawing.

In the drawing:

Fig. 1 represents a vertical section taken centrally through a preferred embodiment of the invention, illustrating the adjustable stop valve element as open, and the movable cock valve element as closed;

Fig. 2, a horizontal section taken on the line 2—2, Fig. 1;

Fig. 3, a vertical section taken on the line 3—3, Fig. 1;

Fig. 4, an enlarged detail view, partly in central vertical section, of the adjustable stop valve element per se;

Fig. 5, a view similar to that of Fig. 4, but illustrating the movable cock valve element, per se;

Fig. 6, a detail view in central vertical section of a somewhat different embodiment of the valve body per se; and Fig. 7, a view corresponding to that of Fig. 1, but fragmentary in character and illustrating another embodiment of the discharge portion of the device.

The valve of the invention is intended for installation well above the normal level of liquid in a container, such as the flush tank of a water closet, so there will be no danger of back siphonage into the supply piping system.

As illustrated in Fig. 1, the valve is secured to the upper end of the vertical supply pipe 10 which extends at least so far above the normal water level 11 in a container, such as a flush tank, as to be entirely free of the danger of back siphonage. Usually, the distance of the valve above the water level will be several inches.

The valve body 12 is preferably cast from bronze, or other non-corrodible material, and machined to finished form. It comprises a depending coupling neck 13, which is internally threaded and coupled to the externally threaded upper end of the supply pipe 10. A passage 14 extends upwardly through the coupling neck 13 and branches out into substantially T formation in the valve body proper, one branch 14a extending through the lateral 15 of the valve body, and the other branch 14b extending through the oppositely extending lateral 16. These passages are advantageously machined from the casting.

The valve body 12 has a depending flange portion 17, which extends concentrically about the coupling neck 13, being spaced apart therefrom, and curved downwardly in substantially cup formation to provide an annular turbulence chamber and flow passage 18 about the coupling neck 13, and, when installed on the supply pipe 10, a relatively narrow annular discharge orifice 19 adjacent the circumferential outer surface of such supply pipe. The annular flow passage 18 is advantageously formed by a core in the casting operation.

The bore of the branch 14b of passage 14 intersects the annular flow passage 18 at 18a so that liquid supplied through supply pipe 10 discharges through the annular orifice 19. Mutually spaced, substantially diagonally disposed ribs 20 are advantageously formed on the inside face of the depending flange 17 for directing down-flow through the passage 18 somewhat vortically toward the discharge orifice 19, so that the discharged liquid, as it descends into the tank, will tend to hug the outer circumferential surface of the supply pipe 10.

An internal wall 21 of the valve body 12 divides the branch 14b of passage 14 from the main portion thereof, and a relatively restricted bore 22 through the wall 21 establishes communication of such branch 14b with the main passage. For controlling flow, a cock valve element 24 is slidably mounted in the branch passage 14b with one end projecting from the valve casing, its movement being under the control of float mechanism, described hereinafter.

The main body 24 of the cock valve element is cylindrical and preferably formed of metal for direct sliding contact with the walls of branch passage 14b. A cylindrical shank portion 24a, of reduced diameter and knobbed as at 24b, extends from the main body 24 and serves to receive and to rigidly retain a flexible resilient sleeve cap 25, advantageously formed of rubber. Such sleeve cap is configurated in conformity with the configuration of the shank 24a, and has a relatively heavy rim portion 25a which is of slightly greater diameter than the body 24 and fits snugly against the shouldered portion thereof at the base of the shank 24a. The rim 25a is under-cut, where it joints the sleeve proper, by preferably a V-shaped annular groove 26, so there will be a packing action of the circumferential face of rim 25a against the walls of branch passage 14b during the sliding movement of the movable cock valve element therein, thus preventing leakage and compensating for wear. The end face 25b of sleeve 25 is adapted to seat against the wall 21 and to close the opening 22 therethrough when the cock valve element is pushed inwardly of the valve body by means of the float mechanism, as described more fully hereinafter.

The adjustable stop valve element is screwed into the branch 14a of the passage 14—which is internally threaded for receiving the same—and comprises an externally threaded cylindrical body 30, preferably of metal, having a shank portion 30a of reduced diameter. The shank 30a is grooved for retaining a flexible resilient sleeve cap 32, which is fitted snugly thereon. Such sleeve cap is advantageously formed of rubber, and has a relatively heavy rim portion 32a which is externally threaded so as to provide a direct continuation of the threading of the main body 30 and to function as packing means for preventing leakage from the valve body. A pin 33 is passed through a suitable opening provided in the unthreaded end of the body 30, and is rigidly secured therein as a handle grip for screwing the stop valve element into and out of the valve body. The end 32b of the flexible resilient sleeve cap is preferably conical, and, when the stop valve element is screwed a sufficient distance inwardly of the valve body 12, seats in the opening of bore 22 entirely shutting off flow of liquid through branch passage 14b. Thus, it can be seen that liquid flow through the valve can be entirely shut off by proper adjustment of the stop valve member 30, and any necessary repairs made on the cock valve element and associated mechanism without shutting off flow of liquid at its source.

The valve body 12 is preferably provided with extending ears 12a and 12b forming a yoke adjacent the protruding end of the movable cock valve element 24. A lever piece 40 is pivoted between the ears 12a and 12b by means of a removable pin 41 which passes through openings suitably provided in the ears, and through a similar opening in the lever piece, there being such an opening in each end thereof, see 42, Fig. 1. A ball float 43 is connected to the lever piece 40 by means of a carrying arm 44 which is threaded into an internally threaded aperture, provided adjacent the mid-portion of the lever piece. Because it is desired that the lever piece 40 provide two leverage ratios for the valve, such internally threaded aperture is provided, and such carrying arm 44 engages, in the lever piece 40, off-center, with respect to the pin-receiving openings 42. Accordingly, the lever piece 40 may have either end pivoted between the ears 12a and 12b, depending upon which leverage is desired for sliding the movable cock valve element 24 into closed position.

The end extremities 40a and 40b of the lever piece 40 are provided with internally threaded openings, as at 45, each adapted to receive the set screw 46. Such set screw is placed in whichever end, 40a or 40b, is uppermost at the time. The forward end of set screw 46 presses against the protruding end of cock valve element 24 under the influence of the ball float 43, which rises with the rise of liquid in the tank.

In operation, the stop valve element 30 is set at open position, as in Fig. 1, so that liquid rising through the supply pipe 10 can flow through the bore 22 in wall 21 when the cock valve element 24 is open. If the level of liquid in the tank is low, the lowered position of the ball float 43 permits the water pressure, through bore 22, to slide the cock valve element 24 backwardly in constant contact with the forward end of set screw 46, thus permitting liquid to flow through the opening 22, into and through the annular passage 18, and out of the annular discharge opening 19. It should be noted that liquid discharging from the orifice 19 is flowing vortically, by reason of the guide ribs 20 in the passage 18, and, therefore, during descent into the tank, tends to hug the supply pipe 10. A circumferential ring 47 may, if desired, be secured about the supply pipe 10 at the location of the discharge opening 19 for stabilizing the outflow of liquid therefrom.

A refill tube 48 communicates with the turbulence chamber 18 at the extreme upper portion thereof, see Fig. 3. It threads into an internally threaded bore, which passes through a boss on the valve body 12 so that its center line is about on the level of, or slightly above or below, the top wall defining the chamber 18. Thus, such bore breaks into chamber 18, and such refill tube 48 communicates with chamber 18, over considerably reduced portions of their normal cross-sectional areas. This structural feature eliminates the necessity for the usual counter boring to obtain a passage of smaller diameter than the diameter of the refill tube.

The embodiment of Fig. 6 represents a valve body, corresponding to the valve body 12 of the previously described embodiment, but formed of two separate parts rather than integrally. This valve body is very similar to the valve body 12, being provided with corresponding passages for the reception of corresponding valve elements (not shown).

The main passage, here 50, with its oppositely extending branches, here 50a and 50b, is preferably provided by a bored metal casting 51 having a relatively broad, depending boss 51c, externally threaded. The passage 50 extends through the boss and is internally threaded, providing a coupling neck 52 for attachment to a supply pipe, such as the pipe 10 of the prior embodiment.

A depending flange, corresponding to 17 of the prior embodiment, is provided by an independent, cup-shaped, open-ended piece 53, which is internally threaded at its upper end and coupled with the external threading of the boss 51c. Such piece 53 defines a turbulence chamber and flow passage 54 which becomes annular and corresponds to the annular flow passage 18 of the prior embodiment when the valve is coupled to a supply pipe, such as the supply pipe 10. In this circumstance, an annular discharge orifice corresponding to 19 of the prior embodiment is also formed, and discharge of liquid occurs as in the prior embodiment. Communication between flow passage 50 and flow passage 54 is provided by the bore 55.

Yoke-forming ears, as at 51d, corresponding to the ears 12a and 12b of the prior embodiment, extend from main casting 51 adjacent the branch passage 50b.

As is obvious, all embodiments of the invention may be very easily manufactured and assembled, and any repairs that might be necessary can be easily made.

In Fig. 7 is illustrated how the discharge characteristic of the invention, namely, a down flow which hugs the supply pipe, is achieved in a manner not involving the creation of vortical flow from the turbulence chamber. Here, the coupling neck 13' terminates well above the lower end of the depending flange 17' allowing space for the installation of a straight-shanked nipple 60 within the annular orifice defined between the lower end of depending flange 17' and supply pipe 10'. The nipple 60 has an internal diameter which is greater than the external diameter of supply pipe 10'. Accordingly, there is defined between the two the relatively narrow discharge orifice 19'. Such discharge orifice differs from 19 of Fig. 1 by reason of its considerably greater length paralleling the length of supply pipe 10'. Because of the relatively long restrictive path provided by discharge orifice 19', and because the upper end portion of nipple 60 defines a trough 61 with depending flange 17', the turbulence of flow through chamber 18' is "ironed out," so to speak, into the desired character of discharge. Ribs in the turbulence chamber, such as 20, Fig. 1, may be dispensed with, since vortical motion of the discharging liquid is not necessary in this instance.

Whereas this invention has been illustrated and described with respect to preferred specific embodiments thereof, it should be understood that many changes can be made in such specific embodiments and that many other specific embodiments may be constructed without departing from the spirit and generic scope of the invention as set forth herein and in the claims which here follow:

I claim:

1. A valve comprising a casing provided with a coupling neck forming an inlet, walls defining an outlet circumferentially of said coupling neck, a flow passage extending through said casing from said inlet to said outlet, valve seating means disposed transversely across said flow passage intermediate said inlet and said outlet, a receiving passage extending from the exterior of said casing and terminating at one side of said valve seating means, a second receiving passage extending from the exterior of said casing and terminating at the opposite side of said valve seating means, said passages being substantially axially aligned and extending angularly relative to said coupling neck an adjustable stop valve element operably positioned in one of said receiving passages and adapted to seat against said valve seating means, and a movable cock valve element slidably positioned in the other of said receiving passages and adapted to seat against said valve seating means.

2. A valve comprising a casing provided with a coupling neck forming an inlet, walls defining an outlet circumferentially of said coupling neck, a flow passage extending through said casing from said inlet to said outlet, valve seating means disposed transversely across said flow passage intermediate said inlet and said outlet, a receiving passage extending from the exterior of said casing and terminating at one side of said valve seating means, a second receiving passage extending from the exterior of said casing and terminating at the opposite side of said valve seating means, an adjustable stop valve element operably positioned in one of said receiving passages and adapted to seat against said valve seating means, a movable cock valve element operably positioned in the other of said receiving passages and adapted to seat against said valve seating means, said adjustable stop valve element including a flexible resilient sleeve having a portion of its length in fluid-sealing engagement with the wall of its therein positioned receiving passage and serving as packing against leakage, and said movable cock valve element also comprising a flexible resilient sleeve having a portion of its length in fluid-sealing engagement with the wall of its therein positioned receiving passage and serving as packing against leakage.

3. A valve comprising a casing provided with a coupling neck forming an inlet, walls defining an outlet circumferentially of said coupling neck, a flow passage extending through said casing from said inlet to said outlet, valve seating means disposed transversely across said flow passage intermediate said inlet and said outlet, a receiving passage extending from the exterior of said casing and terminating at one side of said valve seating means, a second receiving passage extending from the exterior of said casing and terminating at the opposite side of said valve seating means, an adjustable stop valve element operably positioned in one of said receiving passages and adapted to seat against said valve seating means, a movable cock valve element operably positioned in the other of said receiving passages and adapted to seat against said valve seating means, and float mechanism associated with said cock valve element and operable to control the opening and closing movement thereof, said float mechanism comprising a reversible lever piece having pivot means at opposite ends thereof and pivoted to said valve body at a selected one of said pivot means, a float, an arm connecting said float to said lever piece at an off-center location between said pivot means, and means at the upper end of said lever piece contacting said movable cock valve for controlling movement thereof in response to the movement of said float.

4. An entirely integral valve casing comprising a coupling neck forming an inlet, a substantially globular external wall defining an outlet circumferentially of said coupling neck, a flow passage extending from said inlet to said outlet, valve seating means disposed transversely across said flow passage intermediate said inlet and said outlet, a passage communicating with the exterior of said casing and terminating at one side of said valve seating means and adapted to receive a movable valve element, and a second passage communicating with the exterior of said casing and terminating at the other side of said valve seating means and adapted to receive a second movable valve element, said passages being substantially axially aligned and extending angularly relative to said coupling neck.

5. Float operated valve mechanism comprising a valve casing provided with a depending coupling neck forming an inlet, walls defining a turbulence chamber and an outlet circumferentially of said coupling neck, a flow passage extending through said casing from said inlet to said outlet and comprehending said turbulence chamber adjacent said outlet, valve seating means disposed transversely across said flow passage above said turbulence chamber, a movable valve element operably positioned within said casing and adapted to seat against said valve seating means for controlling flow through said flow passage, float mechanism exteriorly of said valve casing and associated with said valve element for controlling the movement thereof, a supply pipe coupled with said coupling neck, and a stabilizing ring disposed in the path of outflow of fluid and secured circumferentially of said supply pipe within said outlet.

6. A valve comprising a casing having a coupling neck forming an inlet, walls defining an outlet circumferentially of said coupling neck and a flow passage extending from said inlet to said outlet circumferentially of said coupling neck, said walls converging toward the axis of said coupling neck substantially diagonally disposed and mutually spaced ribs formed on the inner faces of the said walls immediately above said outlet for imparting substantially vortical, convergent, motion to fluid discharging from said outlet, valve seating means disposed transversely across said flow passage intermediate said inlet and said outlet, and movable valve elements operably positioned within said casing for seating, respectively, against opposite sides of said valve seating means.

7. A valve comprising a casing having a coupling neck forming an inlet, walls defining an outlet circumferentially of said coupling neck and a flow passage extending from said inlet to said outlet circumferentially of said coupling neck, the outlet-defining portions of said walls extending substantially concentrically of and below said coupling neck and having extended length which is substantially parallel therewith for forming a relatively long, annular, restricted discharge passage with a supply piping which is coupled to said neck, said outlet-defining wall portions being angularly related to the flow-passage-defining portions of said walls, and providing therewith an annular trough formation about the upper portion of said annular discharge passage, valve seating means disposed transversely across said flow passage intermediate said inlet and said outlet, and movable valve elements operably positioned within said casing for seating, respectively, against opposite sides of said valve seating means.

8. A valve comprising a casing provided with a coupling neck forming an inlet, and with walls extending concentrically about said coupling neck, spaced therefrom, and joined thereto at the upper end thereof, said concentrically extending walls defining, together with said coupling neck, annular flow and discharge passages, valved passage means extending from the inlet of said coupling neck to the said annular flow and discharge passages, and a bore passing through said concentrically extending walls adjacent the joinder between said walls and said coupling neck, said bore breaking into the said annular flow passage for communication therewith over only a limited portion of the normal cross-sectional area of said bore.

9. In a valve having a threaded passage exposed to fluid pressure, a valve member comprising a shank threaded intermediate its ends for engaging the threads of said passage and a relatively flexible cap positioned over said shank; one end of said relatively flexible cap having a screw thread formation effecting a continuation of the threading of said stem for expansion against the threaded wall of said passage under the influence of fluid pressure.

10. A valve structure comprising an elongated stem having an enlarged threaded portion and a reduced end portion, a shoulder at the juncture of said stem portions, said reduced end portion being completely enclosed by a sleeve of gasket material, one end of said sleeve comprising, an enlarged threaded portion abutting said shoulder, the threads of the sleeve forming a continuation of the threads of the stem and the smaller end of the sleeve forming a valve sealing face.

JESSE D. LANGDON.